Dec. 3, 1968    H. DARDA    3,414,328
HYDRAULICALLY ACTUATED TOOL FOR THE MECHANICAL BREAKING
OF ROCKS BY MEANS OF A WEDGE SLIDABLE
THROUGH INSERT PIECES

Filed Aug. 4, 1966    2 Sheets-Sheet 1

INVENTOR
HELMUT DARDA
BY
Jacob L. Kollin
ATTORNEY

Dec. 3, 1968  H. DARDA  3,414,328
HYDRAULICALLY ACTUATED TOOL FOR THE MECHANICAL BREAKING
OF ROCKS BY MEANS OF A WEDGE SLIDABLE
THROUGH INSERT PIECES
Filed Aug. 4, 1966  2 Sheets-Sheet 2

INVENTOR
HELMUT DARDA
BY
*Jacob L. Kollin*
ATTORNEY

United States Patent Office 3,414,328
Patented Dec. 3, 1968

3,414,328
HYDRAULICALLY ACTUATED TOOL FOR THE MECHANICAL BREAKING OF ROCKS BY MEANS OF A WEDGE SLIDABLE THROUGH INSERT PIECES
Helmut Darda, Blumberg, Baden, Germany
Filed Aug. 4, 1966, Ser. No. 570,353
Claims priority, application Germany, Aug. 11, 1965,
D 47,943
14 Claims. (Cl. 299—22)

ABSTRACT OF THE DISCLOSURE

A hydraulically actuated tool for breaking rocks and the like in which elongated insert members arranged about a slender wedge may be inserted in a prebored hole of a rock so that the latter may be broken during advance of the wedge relative to the insert members and resulting spreading of the latter, and in which the wedge is advanced by hydraulically operated cylinder and piston means constructed to provide proper guiding and protection of upper portions of the wedge and insert members during operation of the tool.

---

In the art of crushing and treating rocks it is known to split these by sequentially inserting or pressing wedges into bored holes in a desired direction. For this purpose there have recently been employed separate insert pieces which were inserted and were pressed away from one another by means of wedges. It is also not new to actuate the wedges hydraulically, as is disclosed, among others in German Patent 960,167 and in U.S. Patent No. 2,385,753.

These known tools are disadvantageous, in that they require bore holes of a large diameter, due to their construction and therefore are not economical in operation. The bore holes usually employed in stone crushing for breaking up of rock fragments, are mostly of a diameter less than 30 mm., and only in special cases 40 mm. at most, since the smaller the diameter of the hole, the lesser the required effort for making it.

In the construction according to the above-mentioned U.S. patent, there are built in, between the insert pieces and the displaceable wedge, supporting roller bearings. These have the disadvantage, in that they require a large space and both the wedge as well as the insert pieces must be of large dimensions, due to the great stress when breaking hard rocks. It therefore happens that the roller supports used with a high hydraulic pressure, do not withstand the resutling stresses and due to the unavoidable penetration of stone dust are quickly damaged. Finally, the bore holes are frequently not bored in a straight line, because the heavy boring hammers are guided manually and for this reason the reinforced boring crowns of the bore rods are easily deflected sideways.

The invention has for its object the provision of a tool for the mechanical crushing of hard rocks by means of at least a pair of insert pieces insertable in bore holes and displaceable from one another by means of an hydraulically actuated wedge, whereby the above described disadvantages are obviated. The tool comprises a piston longitudinally displaceable in a cylinder provided with a slender slidable chisel-like wedge, actuated by high hydraulic pressure, a casing screwed on to said cylinder, in which are suspended symmetric insert pieces which are displaceable and are formed with inclinations corresponding to the pitch of the slidable wedge.

This wedge is characterized by the feature that its upper part is prismoid-shaped, with limiting surfaces extending parallel to one another, whereas only its lower part is wedge-shaped. This embodiment was consciously chosen for the following reason:

Had the wedge proper been designed over its entire length in a wedge shape, i.e. with side surfaces extending towards one another at an acute angle, a considerable stress would result in the area of its head piece. Aside from the fact that the dimensions of the stone crushing tool would be too large when using such a design, it would also be necessary to provide boring holes of extensively larger diameter. To avoid this, the wedge was constructed in the manner shown in FIGURE 1 of the drawing.

This construction results in an handy, manageable tool with which the greatest possible force effect may be achieved in the smallest bore holes.

Advantageously the sidewise reduced displaceable insert pieces are suspended on several cross bolts secured in the casing, and which at the same time serve as guides for the wedge.

In order to mount the insert pieces displaceably in transverse direction, they may be provided with reinforced head pieces at their inner ends with which they are easily displaceable on an inwardly extending shoulder of the casing. This mounting has an additional advantage in that the insert pieces are practically stressed only in tension.

According to a further embodiment of the invention the insert pieces are held displaceably by means of a hardened ring mounted on the collar and by means of an elastic tension ring secured to the outer end of the casing. The insert pieces are thus always held well together and the penetration of stone dust into the tool is substantially obviated.

The insert pieces introduced into the bore holes are advantageously of a circular contour. When however, higher surface pressures are required for splitting of the rocks, insert pieces with a triangular cross-section are suggested.

Instead of at least a pair of insert pieces, the tool according to the invention may also be provided with three or more symmetric inserts. In such cases insert pieces have proven advantageous, which have a total outer diameter of about 18 to 28 or to 42 mm., corresponding to the used bore hole diameter.

According to a further feature of the invention, the insert pieces have an outer conicity corresponding to the wedge angle of the sliding wedge and are advantageously provided at their forward ends with spherical reinforcements extending over about a third of their length.

This configuration makes it possible to make the semicylindrical insert pieces of such dimensions that they are capable to withstand great stresses.

The reinforcement of the insert pieces has the further effect, in that these do not press the bore holes on the entire outer surface and can follow some deflections of the bore holes without being forced out by strong stresses. Last but not the least, the inserts with forward reinforcements have the disadvantage, in that they do not damage the hole edges.

Bearing in mind a simple and certain securement of the sliding wedge extending through the head portion and the surfaces of the insert pieces which guide it, the wedge is securely connected with the piston by means of steel balls inserted in an annular groove of the piston rod.

Advantageously, the insert pieces are provided with axial lubrication recesses in which a lubricant is fed by means of a sponge ring secured in the recess of the sliding wedge.

The entire tool is a relatively light and easily serviceable unit which may be completed by connecting directly the cylinder block with a high pressure-control valve.

An embodiment example is described below in connection with the drawing.

Figure 1:
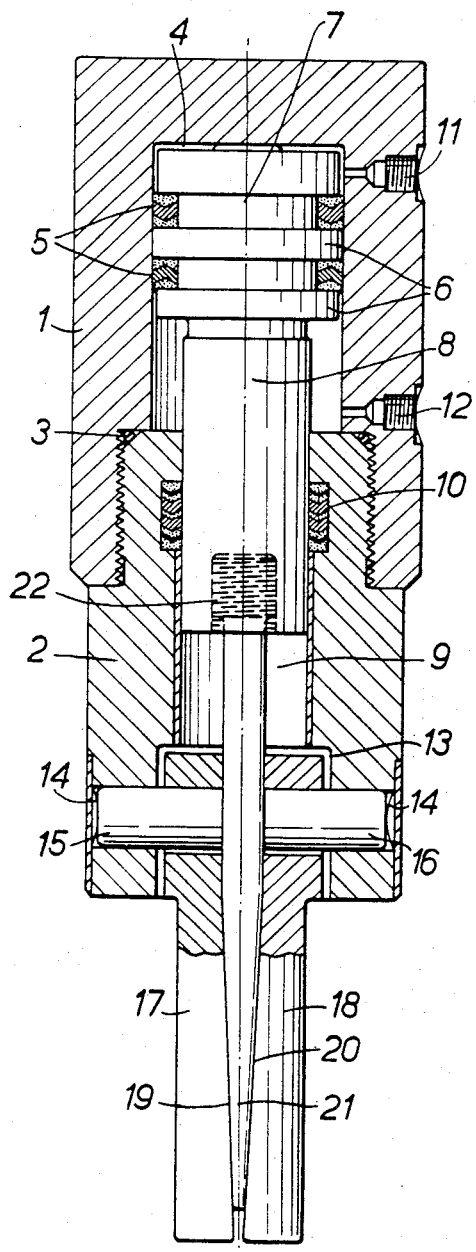
FIG. 1 is the stone splitting tool shown in vertical section.

The splitting tool shown in FIG. 1 is provided with an high pressure cylinder 1, closed at one end by a guide member 2 screwed thereto and sealed by means of an elastic cord seal 3 in an oil-tight manner. The high pressure oil cylinder 1 and the guide member 2 limit the stroke space 4 for the round flange 6 of a piston 7 between the seals 5, the piston rod 8 of which is slidable in a cylindrical bore 9 of the member 2 and is sealed oil-tight by means of a seal 10. The stroke space 4 is provided with an inlet 11 and an outlet 12 for the high pressure oil.

Figure 2:
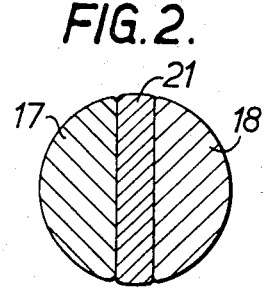
FIG. 2 is a two-part insert with a circular contour, in cross-section.

A counter bore 13 is provided at the lower end of the cylindrical bore 9 of the member 2, in which a pair of springs 14 press bolts 15, 16, inwardly by means of which a pair of inserts 17, 18 of circular section (FIG. 2) are suspended and are displaceable laterally. Both of these inserts 17, 18 are provided with inclined surfaces 19, 20, respectively. A sliding wedge 21 extends into the downwardly narrowing wedge space formed between these inclined surfaces, said wedge being of a slender rectangular shape and being provided with a head 22 screwed into a correspondingly threaded bore of the piston rod 8.

When pressure oil enters the inlet 11, the piston 7 is moved downward with great force, so that taking in account the high pressure and the large piston surface on the one hand and the small pitch of the wedge 19 on both sides of inserts 17, 18, on the other hand, an extremely great cross force is transfered to the inserts, which, in practice, suffices to split very hard rocks. It has been shown that it is possible to split into pieces hard rocks along straight surfaces with relatively few bore holes and tools.

Figure 3:
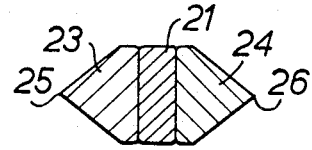
FIG. 3 is a two-part insert with cutters in section.

Under certain conditions, particularly with especially hard rock and when splitting rock into many irregular pieces, it is advantageous to employ the device shown in FIG. 3. In these the insert pieces 23, 24, are provided with longitudinally extending cutting edges 25, 26 which further increase the splitting force acting on the rock.

Figure 4:
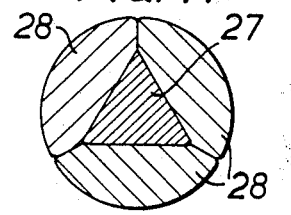
FIG. 4 is a three-part insert with a circular contour in cross-section.
Figure 5:
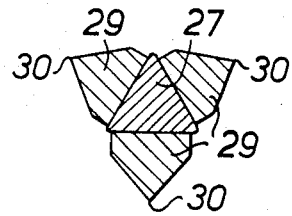
FIG. 5 is a three-part insert with cutters, in section.
Figure 6:
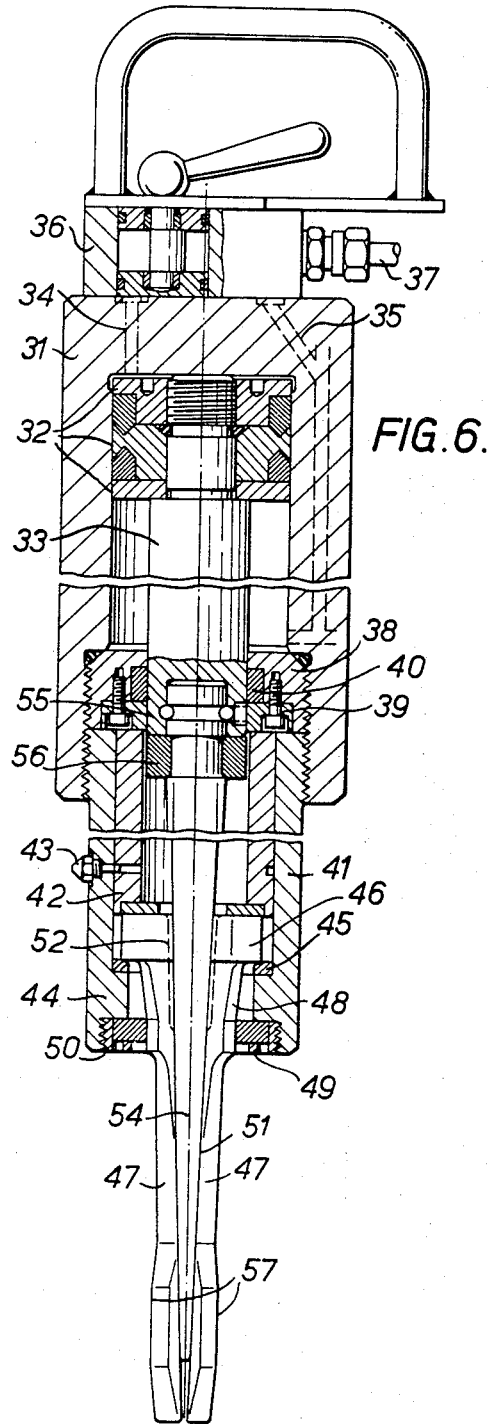
FIG. 6 is a longitudinal section through a modification of the tool.
Figure 8:
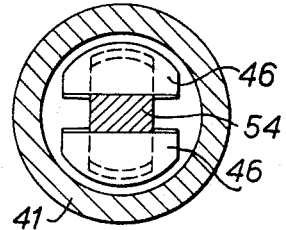
FIG. 8 is a section on line A–B of FIG. 7.
Figure 9:
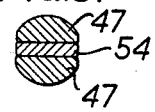
FIG. 9 is a section on line C–D of FIG. 7.
Figure 7:
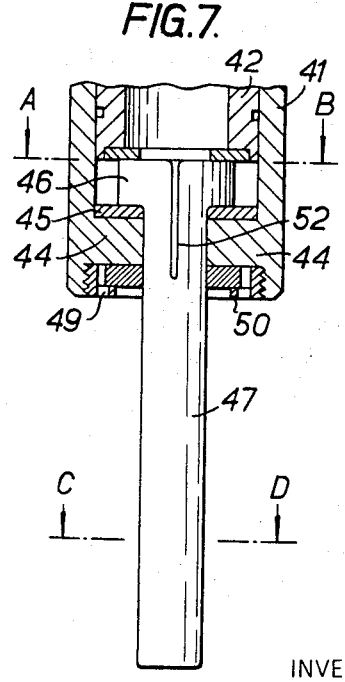
FIG. 7 is a partial longitudinal section of the tool shown in FIG. 6 but taken at an angle disposed at 90° relative to the position shown in FIG. 6.

It is frequently advantageous, in quarries, to first split larger stones into two pieces and then to split these two pieces into as many parts as possible. The devices shown in FIGS. 4 and 5 are particularly well adapted for this purpose. In both of these constructions there are provided three-cornered wedges 27 which act either on three insert pieces 28 with a total circular contour or on three insert pieces 29 with longitudinally extending cutting edges 30.

Three or more insert pieces may be employed according to requirements.

In FIGS. 6 to 9 of the drawing there is shown a splitting tool in another embodiment, having a pressure cylinder 31 in which is mounted a longitudinally displaceable piston rod 33 secured to a two-part piston 32.

Above and under the piston 32, two channels 34 and 35 open into the inner space of cylinder 31, through which the piston 32 may be impacted by a pressure liquid from above or below by means of a high pressure control valve 36. The valve 36 is connected to a hydraulic pump (not shown) by means of a pipe 37.

A guide ring 38 is screwed to the end of the cylinder 31, said guide ring surrounding the piston rod 33 by means of a pressure proof seal 40 held by a screwed on ring 39. A cylindrical member 41 is likewise joined to the guide ring 38 and is screwed in the cylinder 31. A sleeve 42 is inserted in said member 41, said sleeve being provided with a grease fitting 43. The member 41 is provided with an inwardly extending annular shoulder 44 on which hardened ring 45 rests, on which the head portion 46 of two symmetric semi-cylindrical insert pieces 47 are suspended. The latter have intermediate portions 48 which extend through an elastic tension ring 50 secured at the lower end of member 41 by means of a threaded ring 49. Both insert pieces 47 have a conical surface 51 each of which is provided with an axial lubricating recess 52 and cylindrical or ball-shaped reinforcements 57.

The piston rod 33 is connected with a slidable wedge 54, which extends into the space between the conical surfaces 51 through the head portions 46 of the semi-cylindrical inserts 47. The wedge 54 is rotatable on steel balls 55 and is drivingly connected with the piston rod 33 and has a ring-shaped sponge 56 for lubricating material located in an annular groove thereof.

When pressure liquid is supplied to the cylinder 31 through channel 34 as the valve is displaced, the piston 32 and the sliding wedge 54 moves in a direction so that the sliding wedge 54 moves both insert pieces 47 away from one another. Due to the high specific pressure of the pressure liquid and based on the relatively large piston surfaces, the small wedge angle of the sliding wedge 54 and last, but not the least, due to the relatively small contact surfaces of the reinforcements 53, there is effected on these an extraordinary high pressure against the rock which is to be cracked.

The wedge 54 is lubricated by means of the sponge 56 which is pressed against the head piece 46 of the insert piece, as well as to the grease nipple 43. The cylindrical sleeve 42 supports the insert pieces 47 during the return of the piston 33 and the sliding wedge 54 against being taken along.

I claim:

1. Hydraulically actuated tool for breaking rocks and the like, said tool comprising, in combination, cylinder means having a first portion and a second portion coaxially arranged with said first portion, said first portion having an inner cylindrical surface of a diameter greater than the inner cylindrical surface of said second portion; a piston axially reciprocable in said first portion of said cylinder means; a piston rod coaxially fixed to said piston and projecting therefrom in said second portion of said cylinder means and being slidably guided therein; a slender wedge coaxially secured at one end to said piston rod and projecting therefrom beyond said cylinder means, said wedge having faces inclined at least over part the length thereof with respect to each other at an acute angle; a plurality of insert members about said wedge and having inner faces engaging said faces of the wedge, and being inclined according to the inclination of said wedge faces, said insert members having end portions extending into said second portion of said cylinder means; means in said second portion of said cylinder means and supporting said end portions of said insert member movably in transverse direction toward and away from each other; and means for feeding a liquid under pressure in and out of opposite ends of said first portion of said cylinder means to reciprocate said piston and said wedge attached thereto between a working and a return stroke to move during said working stroke said insert members away from each other.

2. A tool as defined in claim 1 wherein said first portion of said cylinder means is formed by a cylinder block having a closed end and said second portion being formed by a tubular member threadingly connecting the other end of said block.

3. A tool as defined in claim 1, wherein said wedge has in transverse cross-section a polygonal configuration, and wherein said insert members have outer faces forming part of a circle.

4. A tool as defined in claim 1, wherein said wedge has in transverse cross-section a polygonal configuration and wherein said insert members have a substantially triangular cross section so as to provide an outer longitudinally extending cutting edge.

5. A tool as defined in claim 1, wherein said wedge and insert members are dimensioned to fit into a prebored hole of a rock and the like of a diameter of 18–38 mm.

6. A tool as defined in claim 1, wherein each of said insert members have a substantially spherical outwardly bulging reinforcement at the outer end thereof extending over about a third of its length.

7. A tool as defined in claim 1, wherein said faces of said wedge in a portion thereof adjacent said one end extend substantially parallel to the wedge axis and wherein the faces extend only inclined to each other at a portion thereof distant from said one end.

8. A tool as defined in claim 1, wherein said second portion of said cylinder means is provided with bores extending substantially normal to the axis of said cylinder means, and wherein said support means comprise pins in said bores and extending slidably through corresponding bores in said end portions of said insert members.

9. A tool as defined in claim 8, and including spring means pressing said inner ends of said pins against said wedge.

10. A tool as defined in claim 1, and including means for lubricating the faces of said wedge engaged by said inner faces of said insert members.

11. A tool as defined in claim 10, wherein said lubricating means comprise lubricating grooves extending in axial direction from said end portions of said insert members along said inner faces thereof, and a sponge ring saturated with lubricating material attached to said wedge in the region of said one end thereof.

12. A tool as defined in claim 1, wherein said end portions of said insert members have outwardly projecting portions, and wherein said support means comprises a radially inwardly projecting shoulder on said second portion of said cylinder member and supporting said outwardly projecting portions.

13. A tool as defined in claim 12, and including a ring of hardened material sandwiched between said shoulder and said outwardly projecting portions.

14. A tool as defined in claim 12, and including a ring of elastic material secured in the region of the end of said second cylinder portion distant from said first portion, said ring surrounding and engaging portions of said insert members intermediate the ends of the latter.

References Cited

UNITED STATES PATENTS

| 301,494 | 7/1884 | Hall et al. | 299—23 |
| 517,689 | 4/1894 | Githens | 299—23 X |
| 2,093,452 | 9/1937 | Joy | 299—22 |

FOREIGN PATENTS 386,027  12/1923  Germany.

ERNEST R. PURSER, *Primary Examiner.*